Nov. 10, 1925.                                              1,560,910
G. F. HANNAM
APPARATUS FOR PURIFYING TALC AND THE LIKE
Filed June 9, 1922
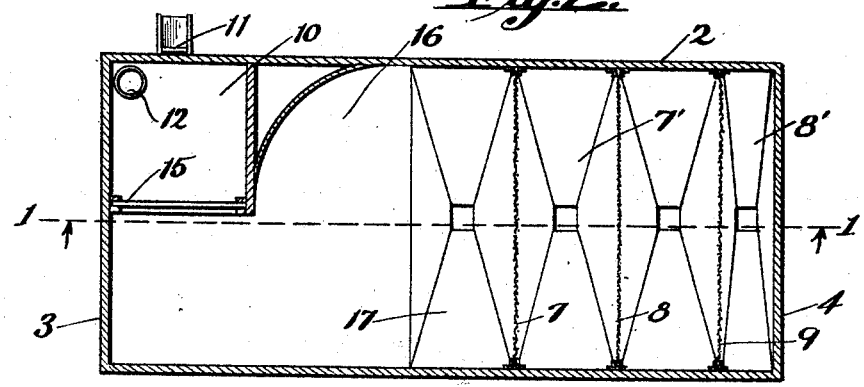
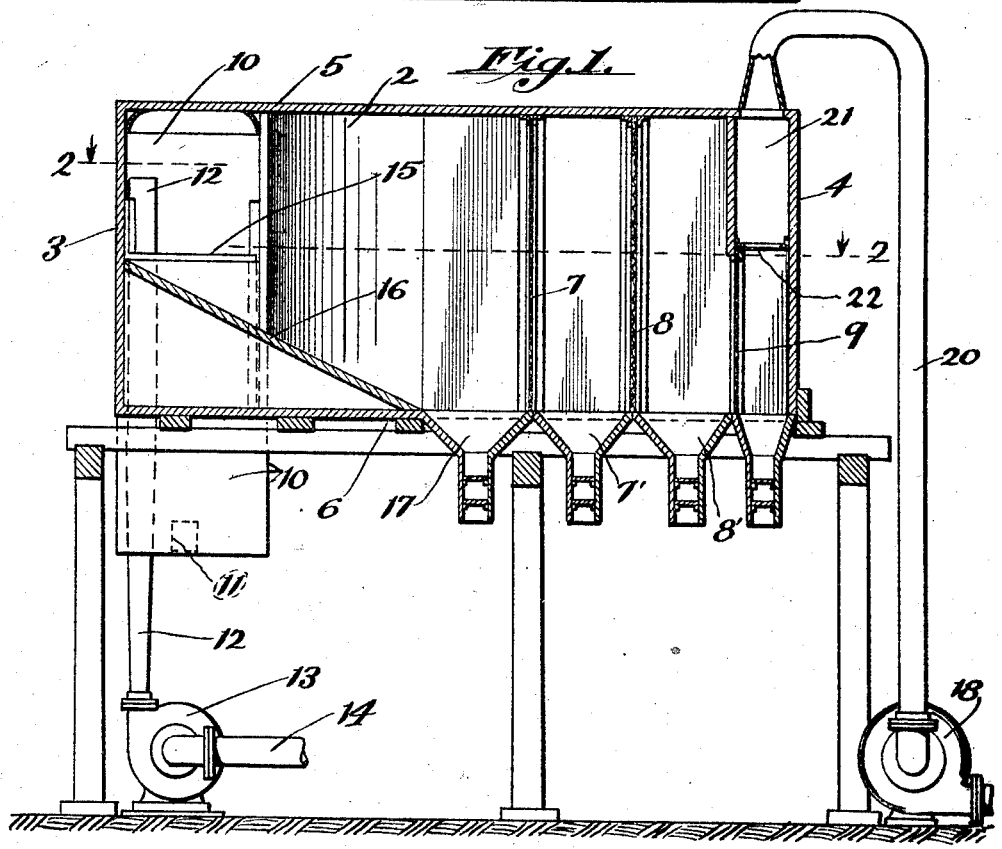
Inventor:
GEORGE F. HANNAM.
By Hazard & Miller
Attorneys Patented Nov. 10, 1925.

1,560,910

UNITED STATES PATENT OFFICE.

GEORGE F. HANNAM, OF LOS ANGELES, CALIFORNIA, ASSIGNOR OF TWO-THIRDS TO AMOS D. KENWORTHY AND ONE-THIRD TO GEORGE E. FROST, JR., BOTH OF PORTLAND, OREGON.

APPARATUS FOR PURIFYING TALC AND THE LIKE.

Application filed June 9, 1922. Serial No. 567,082.

*To all whom it may concern:*

Be it known that I, GEORGE F. HANNAM, a citizen of the United States, residing at Los Angeles, in the county of Los Angeles and State of California, have invented new and useful Improvements in Apparatus for Purifying Talc and the like, of which the following is a specification.

The present invention relates to a method for the pneumatic screening of talc and other finely powdered or fine grained materials, and has for its object particularly to provide an apparatus and method for the treatment of talc so as to effectually remove from the same any grit and other impurities that might be contained in the same.

A further object is to provide for the effective separation of the impurities and grit by operation of a pneumatic apparatus wherein the material is rapidly treated to the action of a current of air both under pressure and under suction, and is directed through screens effecting a subdivision of the particles of the talc according to size.

Other objects will be made manifest in the following specification of an embodiment of the invention illustrated in the accompanying drawings, in which—

Figure 1 is a vertical longitudinal section substantially along the center of the apparatus.

Fig. 2 is a horizontal section on the line 2—2 of Fig. 1.

It is known that talc bearing material as obtained from its natural source is mixed with varying quantities of calcium carbonate, alkaline impurities, and grit of other character, and it is also known that the pure talc particles which are free of impure association have a different coefficient of friction from those particles impregnated with impurities, and by the present apparatus the pure talc particles are separated from the impure particles by treatment of the material to a current of air in which the pure talc particles are carried by reason of their different characters beyond a zone in which the impure particles and the nontalc bearing particles are deposited.

In its present embodiment, the apparatus consists of a substantially oblong housing 2 of suitable dimensions and including closed ends 3 and 4 and the closed top 5. The housing has a bottom 6 and a series of tranverse, vertical screens 7, 8 and 9 constituting separating walls.

At one end of the housing there is provided a vertical compartment 10 which may project down below the bottom 6 and is provided with an outlet gate 11 in a vertical wall. Extending upwardly into the bottom of the compartment 10 there is a blow pipe 12 connected to a blower 13 which is provided with a suction pipe 14 extended to a source of supply (not shown) of material to be treated.

The compartment 10 extends up through the bottom 6 and has at one side a vertically adjustable gate or valve 15. The blow pipe 12 extends well up in the compartment 10 and terminates adjacent to the top of the compartment. The blower being started, the finely floured or pulverized material, such as talc, to be treated is blown into the compartment 10, and because of the greater specific gravity of impurities and of larger fragments of talc, these will tend to settle back immediately in the compartment 10, while the latter and smaller particles of talc, both because of their low weight and also because of their low coefficient of friction, will be carried by the air discharged from the blow pipe 12 through the opening above the gate or valve 15 into the first compartment 16 formed between the end wall 3 and the first screen partition 7 in the housing. The bottom of the compartment 16 is inclined downwardly to a discharge hopper 17. To facilitate the flow of the current of air through the chamber in the housing and through the partitions 7, 8 and 9, a suction fan 18 is connected by a suction pipe 20 to the top of chamber 21 being the last of the series of chambers formed between the screens 7, 8 and 9.

It is found by the practice of the present method that the heavier impurities and the heavier fragments of talc and fragments of talc containing impurities will fall back into the grit collecting compartment 10 from which they may be discharged, as occasion requires, through the outlet gate 11. The pure particles of talc freely float into the chamber 16 and certain of the particles according to their weight will drop therein, while other particles will pass through the screen 7 and fall to the hopper 7' thereof; other particles will pass through the screen 8 and fall into the hopper 8' of its chamber, and the very fine particles will pass through screen 9 into the final collecting chamber 21 which is provided with a transverse screen 22 below the suction mouth of the pipe 20. It is found that the air drawn by the suction fan 18 is substantially free from talc or other particles, and that all of the talc particles collected in the several hoppers 17, 7' and 8' are about 99½% pure.

Considering a given quantity of material to be treated, about 33% of the whole is collected in the grit and dirt receiving compartment 10, while the remaining portion passes into the pure talc collecting hopper.

The rate of flow of the material being treated can be regulated by an adjustment of the gate 15.

Various modifications and changes may be resorted to within the spirit of the invention as claimed.

What is claimed is:

1. In an apparatus for the treatment of pulverized talc bearing material, a horizontal housing provided with a plurality of substantially vertical chambers whose walls are formed of screen material, means comprising a blower and a suction fan for establishing a circulation of air from one end of the housing to the other through the screens, said housing having an initial compartment provided with an adjustable gate or valve and in which the impurities fall and from which the pure particles of talc are carried in the moving stream of air.

2. In an apparatus of the treatment of pulverized talc bearing material, a horizontal housing provided with a plurality of substantially vertical chambers whose separating walls are formed of screen material, means for establishing a circulation of air from one end of the housing to the other through the screens, said housing having an initial compartment provided with an adjustable gate or valve and in which the impurities fall and from which the pure particles of talc are carried in the moving stream of air, said air circulating means consisting of a blower which feeds the material into the housing at one end, and a suction fan for drawing air from the opposite end of the housing.

In testimony whereof I have signed my name to this specification.

GEO. F. HANNAM.